US008253538B1

(12) United States Patent
Chu et al.

(10) Patent No.: US 8,253,538 B1
(45) Date of Patent: Aug. 28, 2012

(54) ASSET MANAGEMENT USING MOBILE RADIO-FREQUENCY IDENTIFICATION (RFID) READERS

(75) Inventors: Chee Hoe Chu, San Jose, CA (US); Ping Zheng, San Jose, CA (US); Joseph R. Goodearly, Livermore, CA (US)

(73) Assignee: Marvell International Ltd., Hamilton (BM)

( * ) Notice: Subject to any disclaimer, the term of this patent is extended or adjusted under 35 U.S.C. 154(b) by 612 days.

(21) Appl. No.: 12/436,460

(22) Filed: May 6, 2009

Related U.S. Application Data

(60) Provisional application No. 61/057,032, filed on May 29, 2008.

(51) Int. Cl.
*H04Q 5/22* (2006.01)

(52) U.S. Cl. .......... 340/8.1; 340/10.1; 340/572.1; 340/539.13

(58) Field of Classification Search .......... 340/10.1, 340/10.2, 10.3, 10.31, 10.4, 540, 572.1, 573.1, 340/568.1, 539.22, 8.1, 9.1
See application file for complete search history.

(56) References Cited

U.S. PATENT DOCUMENTS

| 2002/0130775 | A1* | 9/2002 | Engellenner | 340/540 |
| 2004/0119605 | A1* | 6/2004 | Schaper | 340/825.49 |
| 2006/0197652 | A1* | 9/2006 | Hild et al. | 340/10.2 |
| 2007/0040672 | A1* | 2/2007 | Chinigo | 340/539.22 |
| 2008/0198001 | A1* | 8/2008 | Sarma et al. | 340/539.1 |

* cited by examiner

*Primary Examiner* — Nabil Syed

(57) ABSTRACT

Apparatus having corresponding methods and computer programs comprise: a mobile RFID reader adapted to receive radio-frequency (RF) signals from a plurality of RFID tags, wherein each RF signal represents a tag identifier associated with the respective RFID tag, and wherein the RFID tags include a plurality of asset tags and a plurality of location tags, wherein each of the asset tags is associated with a respective one of a plurality of assets, and wherein each of the location tags is associated with a respective one of a plurality of first locations; and an association module adapted to generate first associations between each of the assets and one or more of the first locations based on the tag identifiers.

21 Claims, 9 Drawing Sheets

ASSET MANAGEMENT USING MOBILE RADIO-FREQUENCY IDENTIFICATION (RFID) READERS

CROSS-REFERENCE TO RELATED APPLICATIONS

This application claims the benefit of U.S. Provisional Patent Application Ser. No. 61/057,032, filed on May 29, 2008, the disclosure thereof incorporated by reference herein in its entirety.

BACKGROUND

The present disclosure relates generally to radio-frequency identification (RFID). More particularly, the present disclosure relates to asset management using a mobile RFID reader.

In radio-frequency identification (RFID) systems for asset management, each asset is tagged with an RFID tag that emits a radio-frequency (RF) signal representing a tag identifier that can be used to identify the tagged asset. Current RFID systems for asset management are generally implemented using one or more fixed RFID readers permanently deployed in each room where the assets are located. Such systems can generally determine in which room an asset is located. In rooms having multiple RFID readers, current systems can determine an approximate location (zone) of an asset in a room based on the location of the RFID reader receiving the strongest RF signal from the asset.

However, such systems suffer from at least two problems. First, asset tracking at the zone level is not precise enough for most applications. A zone may include many assets, so that a search of the zone for the desired asset can consume considerable time. Second, such systems generally require a large number of RFID readers, making such systems very expensive.

SUMMARY

In general, in one aspect, an embodiment features an apparatus comprising: a mobile RFID reader adapted to receive radio-frequency (RF) signals from a plurality of RFID tags, wherein each RF signal represents a tag identifier associated with the respective RFID tag, and wherein the RFID tags include a plurality of asset tags and a plurality of location tags, wherein each of the asset tags is associated with a respective one of a plurality of assets, and wherein each of the location tags is associated with a respective one of a plurality of first locations; and an association module adapted to generate first associations between each of the assets and one or more of the first locations based on the tag identifiers.

In general, in one aspect, an embodiment features a method comprising: receiving radio-frequency (RF) signals from a plurality of radio-frequency identification (RFID) tags into a mobile RFID reader, wherein each RF signal represents a tag identifier associated with the respective RFID tag, and wherein the RFID tags include a plurality of asset tags and a plurality of location tags, wherein each of the asset tags is associated with a respective one of a plurality of assets, and wherein each of the location tags is associated with a respective one of a plurality of first locations; and generating first associations between each of the assets and one or more of the first locations based on the tag identifiers.

In general, in one aspect, an embodiment features an apparatus comprising: a network interface adapted to receive a plurality of first tag identifiers, wherein each of the first tag identifiers is associated with a respective RFID tag, and wherein the RFID tags include a plurality of asset tags and a plurality of location tags; a RFID database adapted to store a plurality of entries, wherein the entries comprise a plurality of first entries, wherein each of the first entries associates one of the asset tags with a respective one of a plurality of assets, and a plurality of second entries, wherein each of the second entries associates one of the location tags with a respective one of a plurality of locations; and an association module adapted to generate first associations between each of the assets and one or more of the first locations based on the first tag identifiers, the first entries, and the second entries.

In general, in one aspect, an embodiment features a computer program comprising: instructions for receiving a plurality of tag identifiers, wherein each tag identifier is represented by a respective radio-frequency (RF) signal received from a radio-frequency identification (RFID) tag into a mobile RFID reader, wherein the RFID tags include a plurality of asset tags and a plurality of location tags, wherein each of the asset tags is associated with a respective one of a plurality of assets, and wherein each of the location tags is associated with a respective one of a plurality of first locations; and instructions for generating first associations between each of the assets and one or more of the first locations based on the tag identifiers.

The details of one or more implementations are set forth in the accompanying drawings and the description below. Other features will be apparent from the description and drawings, and from the claims.

Figure 1:
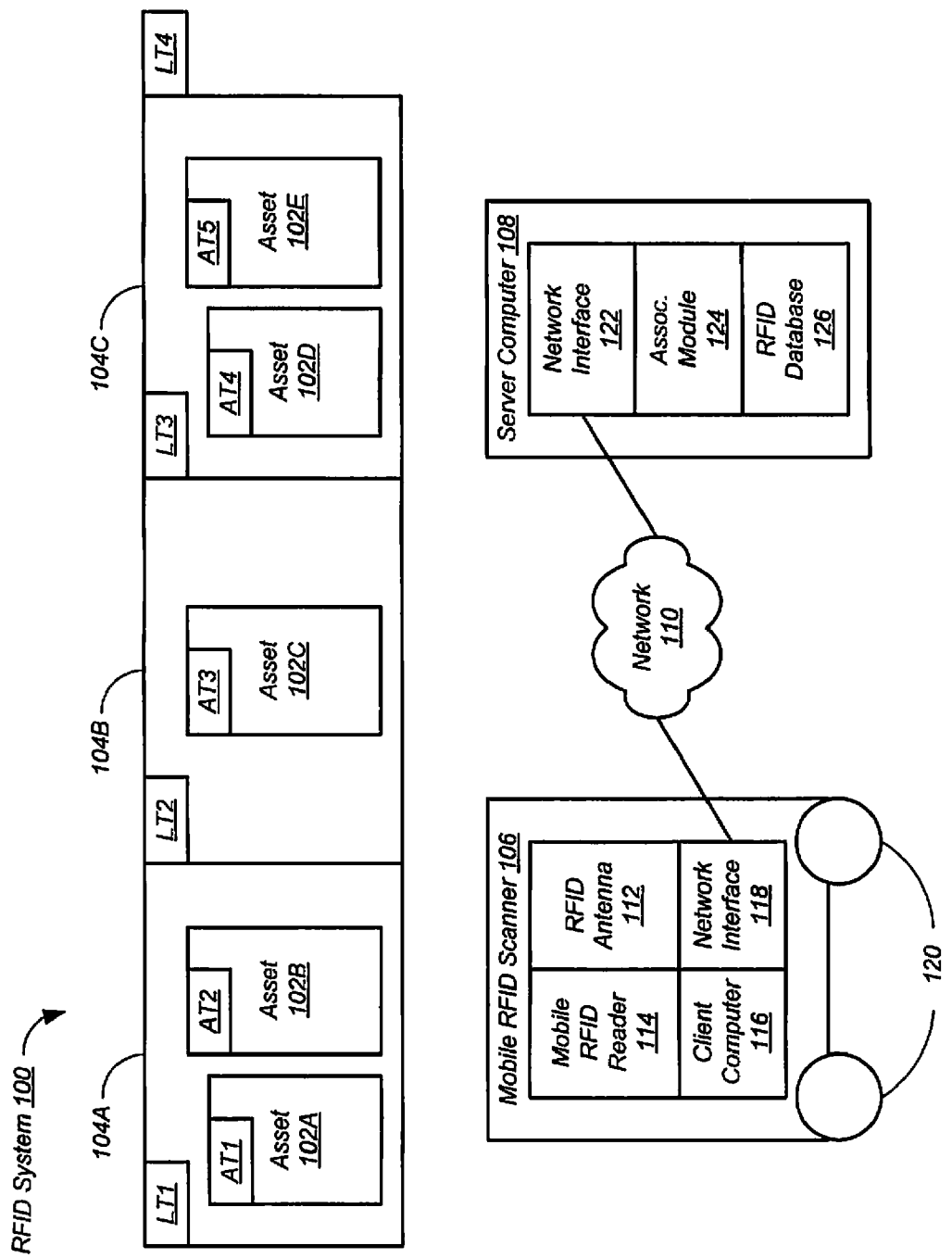
FIG. 1 shows elements of a radio-frequency identification (RFID) system in scan mode according to some embodiments.

The leading digit(s) of each reference numeral used in this specification indicates the number of the drawing in which the reference numeral first appears.

DETAILED DESCRIPTION

Embodiments of the present disclosure provide elements of a low-cost, scalable system for asset management using mobile radio-frequency identification (RFID) readers. The system can operate in several modes, including scan, search, locate, and doorway modes. The system can also include a data entry mode for entry of the operating parameters described below into an operating database. For example, the parameters can include tag ID, asset, location, make, model, serial number, and the like.

In scan mode, a mobile RFID reader receives radio-frequency (RF) signals from RFID tags as the mobile RFID reader is moved relative to the RFID tags. Each RF signal represents a tag identifier associated with the respective RFID tag. The RFID tags include asset tags and location tags. Each asset tag is associated with an asset. Each location tag is associated with a location. For example, the assets can be electronic devices such as computers, each having a respective RFID tag attached, and the locations can be shelving units in which the assets are stored. An association module generates associations between each of the assets and one or more of the locations based on the RF signals. The association module can generate the associations based on times of reception of the RF signals, the order of reception of the RF signals, and the like.

In search mode, an input module accepts an indication of one or more of the assets. Then a search module identifies one or more of the locations based on the indication and the associations generated during scan mode.

In locate mode, an input module accepts an indication of one or more of the assets. Then a locate module generates an alert when an RF signal representing a tag identifier associated with the indicated asset(s) is received by the mobile RFID reader.

In doorway mode, a motion detector and a fixed RFID reader are fixed in a location such as a doorway of a room in which the assets are stored. When the motion detector detects motion in the location, a camera creates an image of the location, and the fixed RFID reader captures any RF signals present in the location. The association module then generates an association among the location, the image, and any assets associated with tag identifiers represented by the RF signals captured by the fixed RFID reader.

FIG. 1 shows elements of a radio-frequency identification (RFID) system 100 in scan mode according to some embodiments. Although in the described embodiments, the elements of RFID system 100 are presented in one arrangement, other embodiments may feature other arrangements, as will be apparent to one skilled in the relevant arts based on the disclosure and teachings provided herein. For example, the elements of RFID system 100 can be implemented in hardware, software, or combinations thereof.

Referring to FIG. 1, RFID system 100 includes five assets 102A-E stored in three storage units 104A-C. However, embodiments of the present disclosure are scalable to any number of assets 102 and storage units 104. Assets 102 can include any sort of asset. For example, assets 102 can include electronic devices and the like. Storage units 104 can include any sort of storage units as long as the RFID asset tags of the assets 102 stored therein are sufficiently exposed for reading by an RFID reader. For example, storage units 104 can include shelving units, disk drive bays and the like. For example, individual disk drives mounted in computer disk drive bays can be tagged individually as assets 102, for example using tag hangers to expose the tags for reading.

RFID tags are attached to each asset 102 and storage unit 104. Each RFID tag has a different tag identifier. For clarity of description, the RFID tags attached to assets 102 are referred to as "asset tags" AT1-AT5, while the RFID tags attached to storage units 104 are referred to as "location tags" LT1-LT3. However, asset tags AT and location tags LT can be identical except for the tag identifiers encoded therein. RFID tags AT, LT can be implemented in any manner, can be active or passive, and the like.

RFID system 100 further includes a mobile RFID scanner 106 in communication with a server computer 108 over a network 110. Network 110 can be implemented as a wide-area network (WAN) such as the Internet, a local-area network (LAN), or the like. In other embodiments, network 110 can be replaced by a direct communication link.

Mobile RFID scanner 106 includes one or more RFID antennas 112, a mobile RFID reader 114, a client computer 116, and a network interface 118. RFID antenna(s) 112 and RFID reader 114 can be implemented in any manner. For example, RFID antennas 112 and mobile RFID reader 114 can be commercially-available units. Client computer 116 can be implemented as a commercially-available general-purpose computer, as a special-purpose computer, and the like. Network interface 118 can be implemented in any manner. For example, network interface 118 can be a commercially-available unit. To further mobility of mobile RFID scanner 106, network interface 118 is preferably a wireless network interface.

Mobile RFID scanner 106 is shown mounted on wheels 120 for mobility. In various embodiments, mobile RFID scanner 106 can be mounted on a standard utility cart, as a hand-held unit, and the like. For example, for large warehouse applications, Mobile RFID scanner 106 can be mounted on a truck, forklift, and the like. In addition, multiple mobile RFID scanners 106 can be implemented on a single platform or vehicle.

Server computer 108 includes a network interface 122, an association module 124, and an RFID database 126. Server computer 108 can be implemented as a commercially-available general-purpose computer, as a special-purpose computer, and the like. Network interface 122 can be implemented in any manner. For example, network interface 122 can be a commercially-available unit.

Association module 124 can be implemented in any manner. For example, association module 124 can be implemented as a software module for execution by a processor of server computer 108. RFID database 126 can be stored on a memory, storage device, or the like of server computer 108.

Before scanning begins, each RFID tag AT, LT is registered in RFID database 126. That is, an entry is created in RFID database 126 for each RFID tag AT, LT. For example, RFID database 126 can include an asset table for asset tags AT and a location table for location tags LT. Example asset and location tables for the example of FIG. 1 are presented below as Tables 1 and 2, respectively.

Referring to Table 1, each entry for asset tags AT includes the tag identifier encoded into the asset tag AT, along with information describing the tagged asset 102 such as make, model, serial number, and the like. For clarity of description, reference numbers from FIG. 1 are used as the tag identifiers in Table 1.

TABLE 1

Asset Table

| Tag ID | Make | Model | Serial Number |
|---|---|---|---|
| AT1 | Make1 | Model1 | Serno1 |
| AT2 | Make2 | Model2 | Serno2 |
| AT3 | Make3 | Model3 | Serno3 |
| AT4 | Make4 | Model4 | Serno4 |
| AT5 | Make5 | Model5 | Serno5 |

Referring to Table 2, each entry for location tags LT includes the tag identifier encoded into the location tag LT, along with information describing the location of the tagged storage unit 104 such as building number, room number, aisle, storage unit number, and the like. In implementations involving locations in multiple cities, the location information can include, city, state, country, and the like. For clarity of description, reference numbers from FIG. 1 are used as the tag identifiers in Table 2. In addition, it is assumed that storage units 104 are the first three storage units on aisle A in room 222 of a one-building implementation.

TABLE 2

Location Table

| Tag ID | Room | Aisle | Unit |
|--------|------|-------|------|
| LT1 | 222 | A | 1 |
| LT2 | 222 | A | 2 |
| LT3 | 222 | A | 3 |

Figure 2:
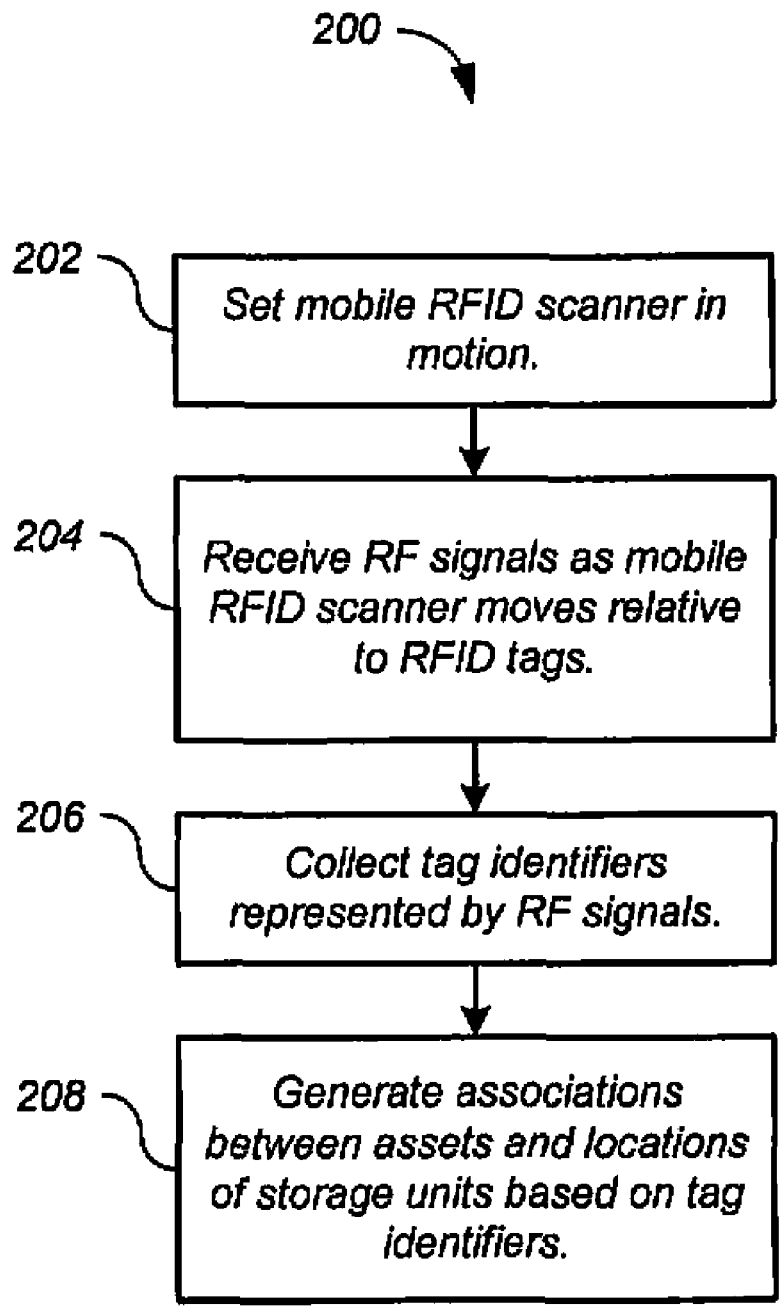
FIG. 2 shows a process for the RFID system of FIG. 1 in scan mode according to some embodiments.

FIG. 2 shows a process 200 for RFID system 100 of FIG. 1 in scan mode according to some embodiments. Although in the described embodiments, the elements of process 200 are presented in one arrangement, other embodiments may feature other arrangements, as will be apparent to one skilled in the relevant arts based on the disclosure and teachings provided herein. For example, in various embodiments, some or all of the steps of process 200 can be executed in a different order, concurrently, and the like.

Referring to FIG. 2, mobile RFID scanner 106 is set in motion (step 202). The motion of mobile RFID scanner 106 can be controlled manually or automatically. For example, in a manual implementation, mobile RFID scanner 106 can be pushed or driven by a human operator past storage units 104. As another example, in an automatic implementation, mobile RFID scanner 106 can automatically follow a magnetic or optical track affixed to the floor past storage units 104.

As mobile RFID scanner 106 moves relative to RFID tags AT, LT, mobile RFID reader 114 receives radio-frequency (RF) signals from RFID tags AT, LT through RFID antenna 112 (step 204). Each RF signal represents a tag identifier associated with the respective RFID tag AT, LT. Client computer 116 collects the tag identifiers (step 206), and passes the tag identifiers to server computer 108, either individually or in batches.

At server computer 108, association module 124 generates associations between assets 102 and the locations of storage units 104 based on the tag identifiers received from mobile RFID scanner 106 (step 208). The associations can be generated based on times of reception of the RF signals by mobile RFID reader 114, the order of reception of the RF signals, and the like. In the example of FIG. 1, the tag identifiers are collected in the following order, with mobile RFID scanner 106 moving from left to right in FIG. 1: LT1, AT1, AT2, LT2, AT3, LT3, AT4, AT5. With knowledge that the each location tag LT is mounted on the left side of a storage unit 104, association module 124 creates the associations shown in Table 3, referred to as the cross-reference table, which is added to RFID database 126.

TABLE 3

Cross-Reference Table

| Asset Tag ID | Location Tag ID1 | Location Tag ID2 |
|--------------|------------------|------------------|
| AT1 | LT1 | LT2 |
| AT2 | LT1 | LT2 |
| AT3 | LT2 | LT3 |
| AT4 | LT3 | LT4 |
| AT5 | LT3 | LT4 |

Tables 1-3 together now define associations between assets 102 and their locations in storage units 104. These associations can be used in search mode, locate mode, and doorway mode, as described below. Referring to Table 3, note that each asset 102 can have multiple locations if desired.

Figure 3:
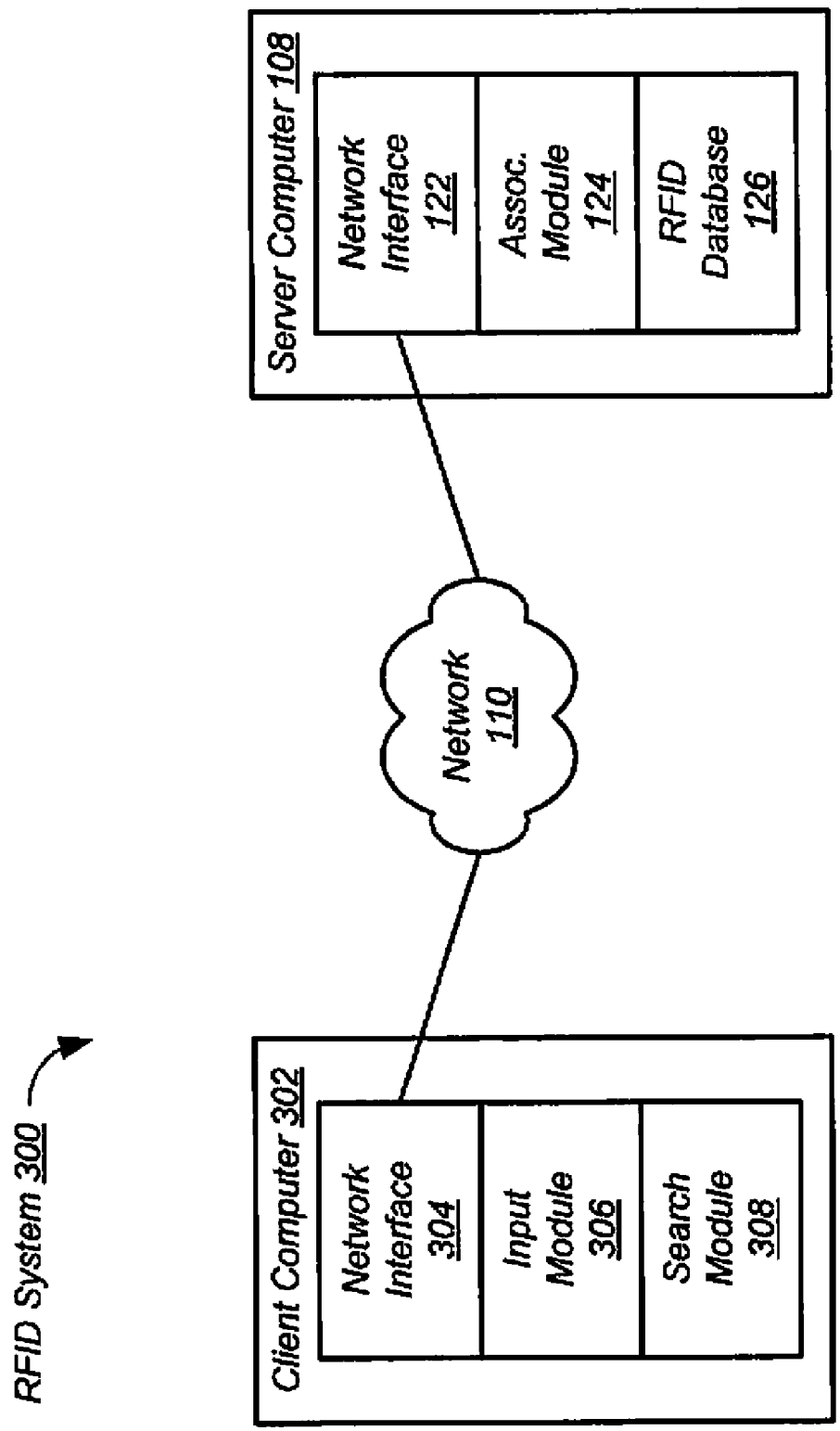
FIG. 3 shows elements of a RFID system in search mode according to some embodiments.

FIG. 3 shows elements of a radio-frequency identification (RFID) system 300 in search mode according to some embodiments. Although in the described embodiments, the elements of RFID system 300 are presented in one arrangement, other embodiments may feature other arrangements, as will be apparent to one skilled in the relevant arts based on the disclosure and teachings provided herein. For example, the elements of RFID system 300 can be implemented in hardware, software, or combinations thereof.

Referring to FIG. 3, RFID system 300 includes a client computer 302 in communication with server computer 108 over network 110. Server computer 108 and network 110 can be implemented as described above.

Client computer 302 can be implemented as a commercially-available general-purpose computer, as a special-purpose computer, and the like. Client computer 302 includes a network interface 304, an input module 306, and a search module 308. Input module 306 and search module 308 can be implemented in any manner. For example, input module 306 and search module 308 can be implemented as software modules for execution by a processor of client computer 302. In other embodiments, all or part of input module 306 and search module 308 can be implemented on server computer 108.

Network interface 304 can be implemented in any manner. For example, network interface 304 can be a commercially-available unit.

Figure 4:
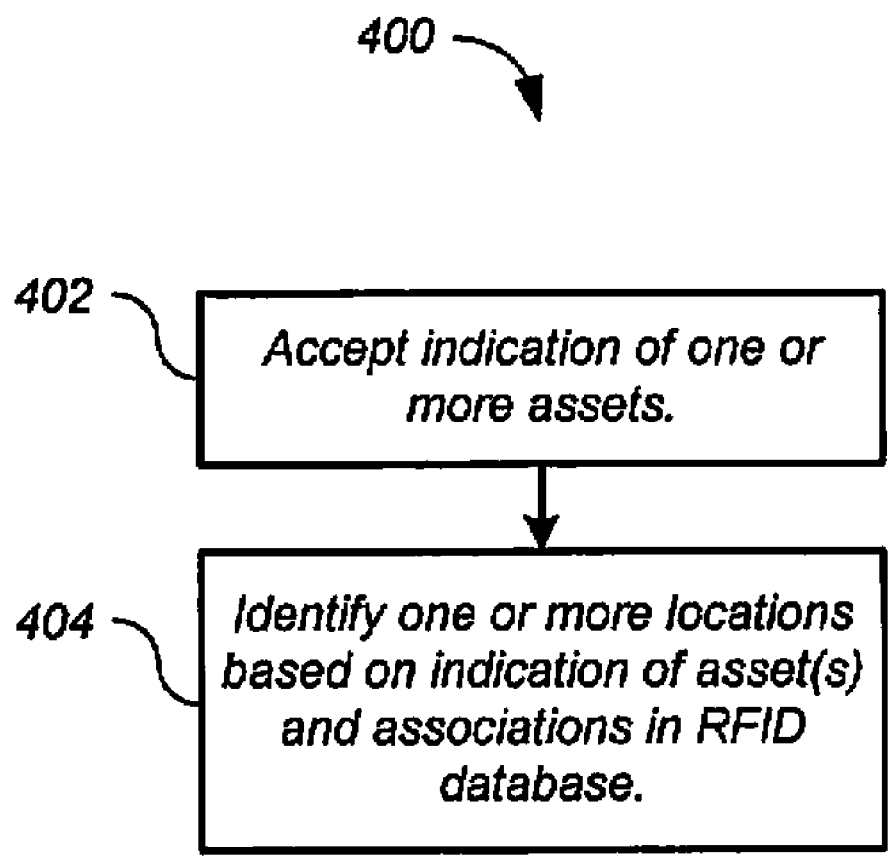
FIG. 4 shows a process for the RFID system of FIG. 3 in search mode according to some embodiments.

FIG. 4 shows a process 400 for RFID system 300 of FIG. 3 in search mode according to some embodiments. Although in the described embodiments, the elements of process 400 are presented in one arrangement, other embodiments may feature other arrangements, as will be apparent to one skilled in the relevant arts based on the disclosure and teachings provided herein. For example, in various embodiments, some or all of the steps of process 400 can be executed in a different order, concurrently, and the like.

Referring to FIG. 4, input module 306 accepts an indication of one or more assets 102 (step 402). For example, input module 306 can provide a graphical user interface (GUI) where a user can enter one or more search parameters such as values for the fields shown in Table 1. That is, a user can specify the make, model, serial number, and the like, of the asset 102 sought. Alternatively, input module 306 can provide a GUI listing some or all of the assets 102 in RFID database 126, allowing the user to select one or more of the assets 102. Mobile RFID scanner 106 sends the indication of the asset(s) to server computer 108. In particular, network interface 118 of mobile RFID scanner 106 transmits the indication, and network interface 122 of server computer 108 receives the indication.

Search module 308 identifies one or more locations based on the user-provided indication of asset(s) 102 and the associations in RFID database 126 (step 404). For example, if the user indicates asset 102C, search module 308 indexes the cross-reference table (Table 3 above) using the asset tag identifier AT3, which returns the location tag identifier LT3. Search module 308 then indexes the location table (Table 2 above), which returns the location as Room 222, Aisle A, Unit 2. Server computer provides the location to mobile RFID scanner 106 using network interfaces 122 and 118.

Alternatively, location tags can be placed more densely than one per storage unit 104. In these embodiments, search module 308 can return the locations that surround the asset 102. For example, assume that storage units 104A-C are not separate storage units, but form a single storage unit 104. In such embodiments, search module 308 can return the location of asset 102C as being between location tags LT2 and LT3 in Room 222, Aisle A.

Figure 5:
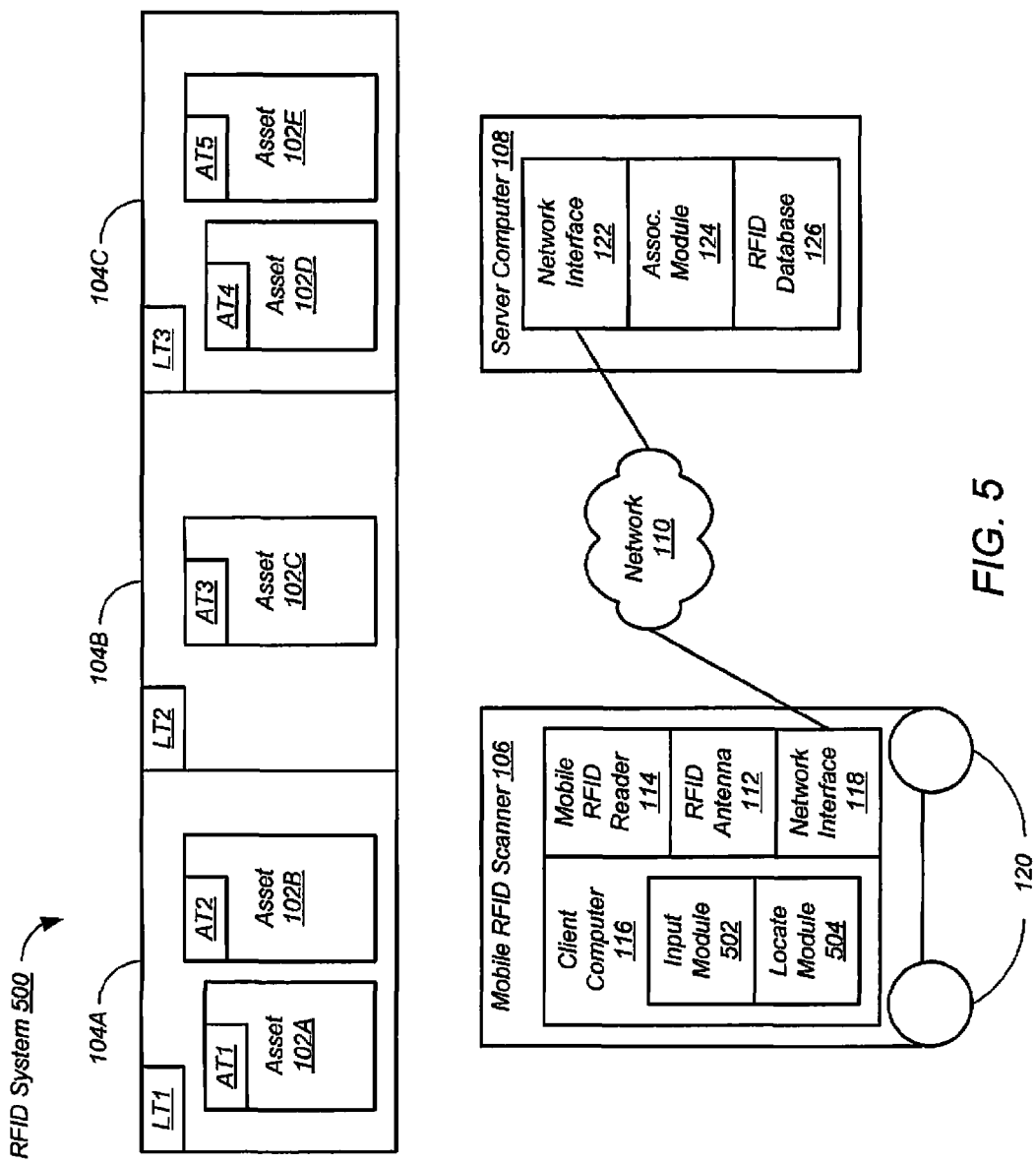
FIG. 5 shows elements of a RFID system in locate mode according to some embodiments.

FIG. 5 shows elements of a radio-frequency identification (RFID) system 500 in locate mode according to some embodiments. Although in the described embodiments, the elements of RFID system 500 are presented in one arrangement, other embodiments may feature other arrangements, as will be apparent to one skilled in the relevant arts based on the disclosure and teachings provided herein. For example, the elements of RFID system 500 can be implemented in hardware, software, or combinations thereof.

Referring to FIG. 5, RFID system 500 includes five assets 102A-E stored in three storage units 104A-C. RFID system 500 further includes mobile RFID scanner 106 in communication with server computer 108 over a network 110. Mobile RFID scanner 106 includes one or more RFID antennas 112, a mobile RFID reader 114, a client computer 116, and a network interface 118. Server computer 108 includes a network interface 122, an association module 124, and an RFID database 126. Each of these elements can be implemented as described above.

Client computer 116 includes an input module 502 and a locate module 504. Input module 502 and locate module 504 can be implemented in any manner. For example, input module 502 and locate module 504 can be implemented as software modules for execution by a processor of client computer 116. In other embodiments, all or part of input module 502 and locate module 504 can be implemented on server computer 108. Input module 502 and locate module 504 can also be implemented in hardware or a combination of hardware and software.

Figure 6:
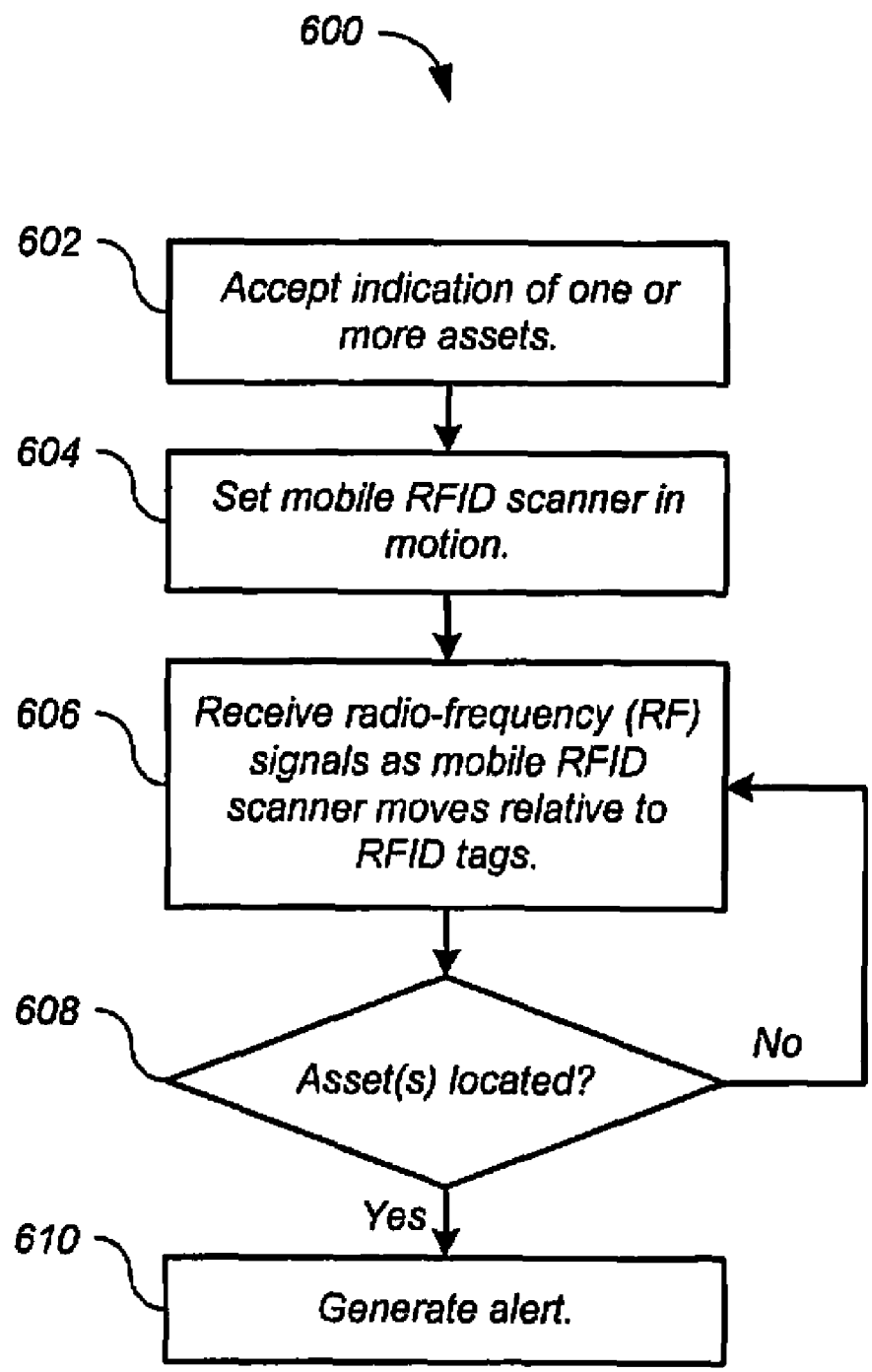
FIG. 6 shows a process for the RFID system of FIG. 5 in locate mode according to some embodiments.

FIG. 6 shows a process 600 for RFID system 500 of FIG. 5 in locate mode according to some embodiments. Although in the described embodiments, the elements of process 600 are presented in one arrangement, other embodiments may feature other arrangements, as will be apparent to one skilled in the relevant arts based on the disclosure and teachings provided herein. For example, in various embodiments, some or all of the steps of process 600 can be executed in a different order, concurrently, and the like.

Referring to FIG. 6, input module 502 accepts an indication of one or more assets 102 (step 602). For example, input module 502 can provide a graphical user interface (GUI) where a user can enter one or more search parameters such as values for the fields shown in Table 1. That is, a user can specify the make, model, serial number, and the like, of the asset 102 to be located. Alternatively, input module 502 can provide a GUI listing some or all of the assets 102 in RFID database 126, allowing the user to select one or more of the assets 102. Mobile RFID scanner 106 sends the indication of the asset(s) to server computer 108. In particular, network interface 118 of mobile RFID scanner 106 transmits the indication, and network interface 122 of server computer 108 receives the indication. Association module 124 of server computer 108 identifies one or more tag identifiers associated with the one or more assets 102 based on the indication. Server computer 108 provides the tag identifiers to mobile RFID scanner 106 using network interfaces 122 and 118.

Mobile RFID scanner 106 is then set in motion (step 604), for example as described above. As mobile RFID scanner 106 moves relative to RFID tags AT, LT, mobile RFID reader 114 receives radio-frequency (RF) signals RFID tags AT, LT through RFID antenna 112 (step 606), also as described above. When an RF signal representing a tag identifier associated with the asset(s) 102 to be located is received by mobile RFID reader 114 (step 608), locate module 504 generates an alert (step 610). The alert can take any form, such as a sound, light, or the like.

Figure 7:
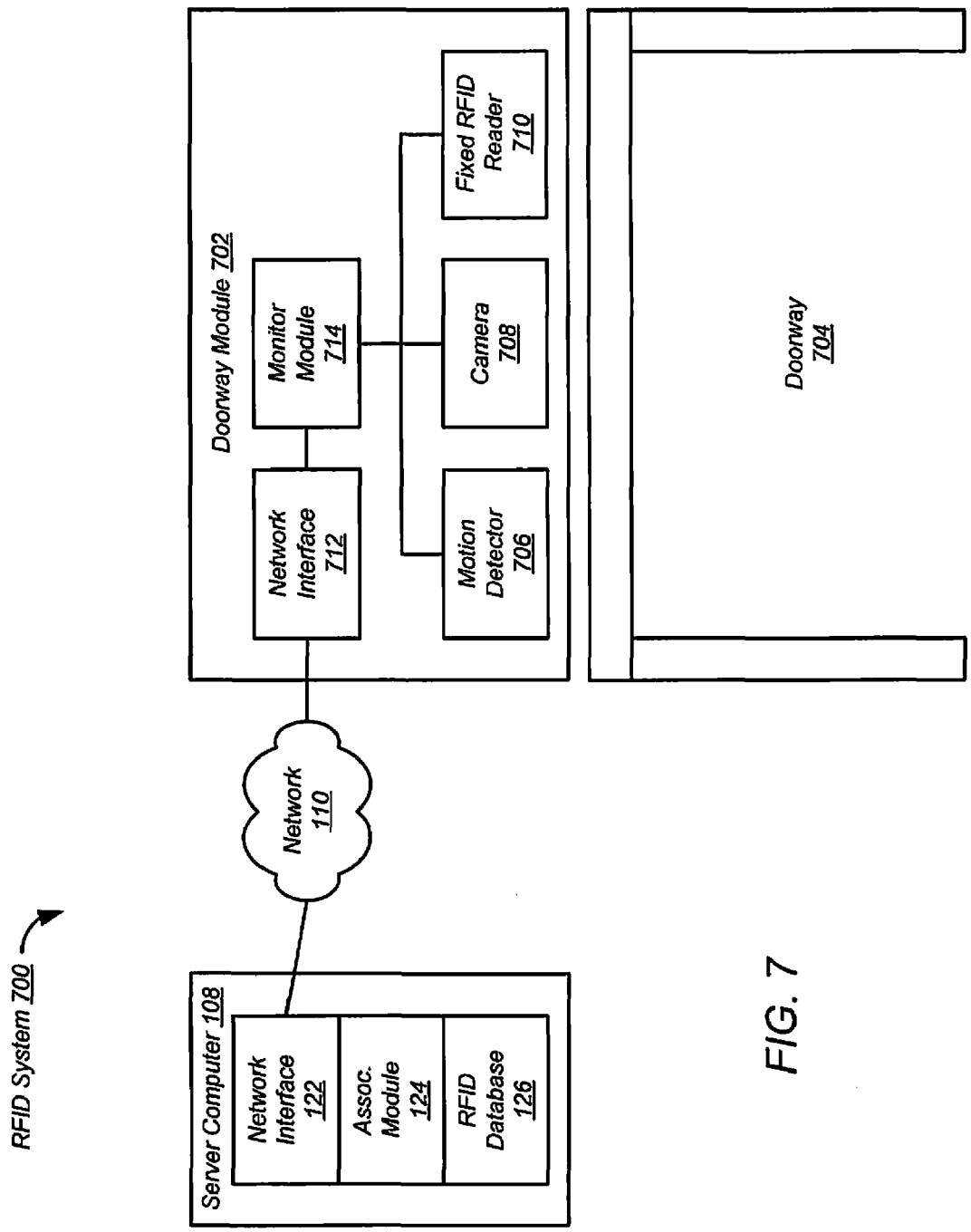
FIG. 7 shows elements of a RFID system in doorway mode according to some embodiments.

FIG. 7 shows elements of a radio-frequency identification (RFID) system 700 in doorway mode according to some embodiments. Although in the described embodiments, the elements of RFID system 700 are presented in one arrangement, other embodiments may feature other arrangements, as will be apparent to one skilled in the relevant arts based on the disclosure and teachings provided herein. For example, the elements of RFID system 700 can be implemented in hardware, software, or combinations thereof. As another example, although RFID system 700 is described as monitoring a doorway, RFID system 700 can be used to monitor any location.

Referring to FIG. 7, RFID system 700 may include a doorway module 702 in communications with server computer 108 over network 110. Server computer 108 and network 110 can be implemented as described above.

Doorway module 702 monitors a doorway 704, and includes a motion detector 706, a fixed RFID reader 710, and a network interface 712, and can optionally include a camera 708. Doorway module 702 can also include a monitor module 714 to manage motion detector 706, fixed RFID reader 710, and camera 708. These elements can be implemented in any manner. For example, motion detector 706, RFID reader 710, and network interface 712 can be implemented as commercially-available units, and camera 708 can be implemented as a commercially-available IP camera or the like.

Figure 8:
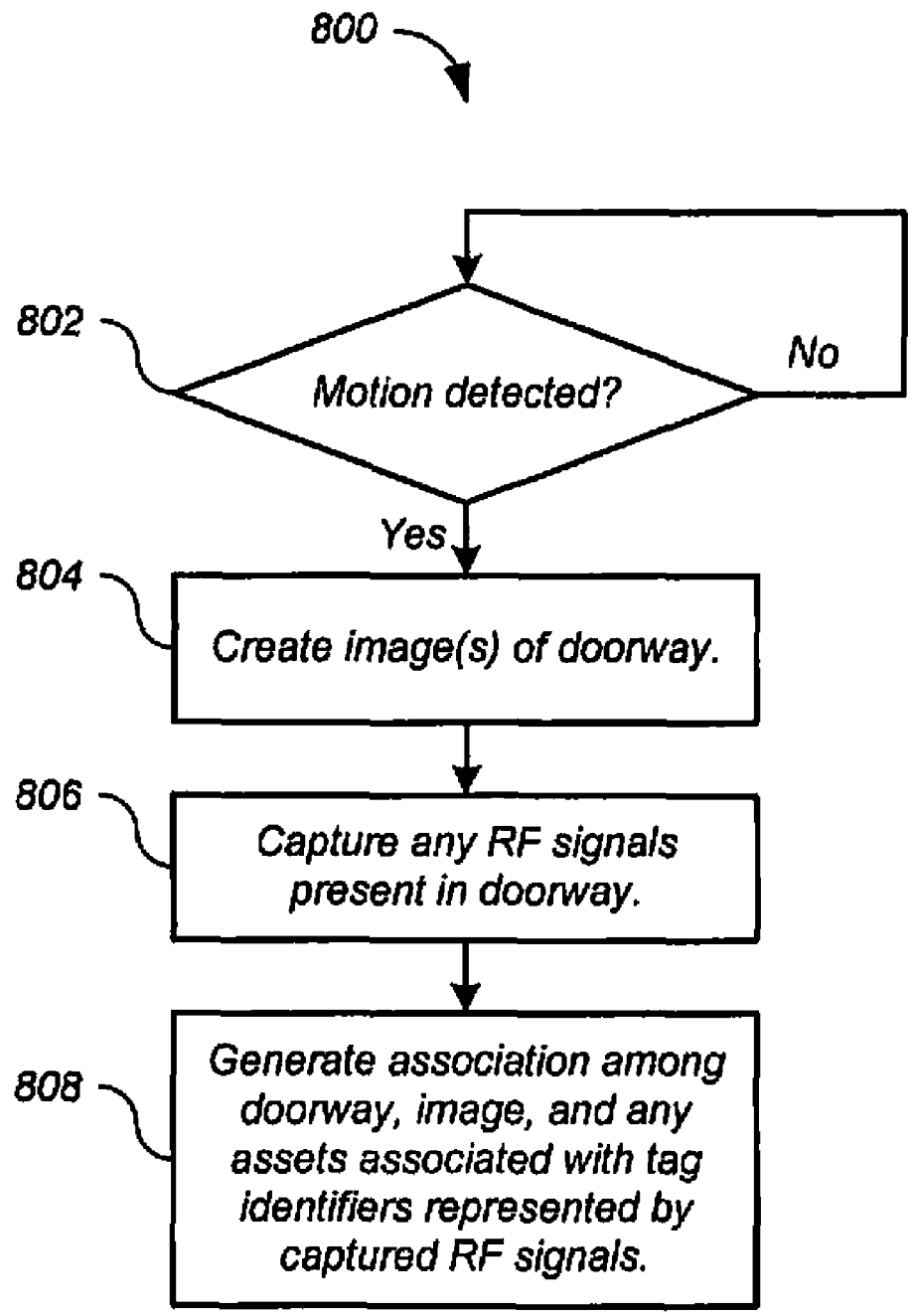
FIG. 8 shows a process for the RFID system of FIG. 7 in doorway mode according to some embodiments.

FIG. 8 shows a process 800 for RFID system 700 of FIG. 7 in doorway mode according to some embodiments. Although in the described embodiments, the elements of process 800 are presented in one arrangement, other embodiments may feature other arrangements, as will be apparent to one skilled in the relevant arts based on the disclosure and teachings provided herein. For example, in various embodiments, some or all of the steps of process 800 can be executed in a different order, concurrently, and the like.

Referring to FIG. 8, when motion detector 706 detects motion in doorway 704 (step 802), optional camera 708 creates one or more images of doorway 704 (step 804), and fixed RFID reader 710 captures any RF signals present in doorway 704 (step 806). Network interface 712 transfers the image(s), and the tag identifiers represented by the captured RF signals, to server computer 108, using network interfaces 118 and 122.

At server computer 108, association module 124 generates an association among doorway 704, the image(s), and any assets 102 associated with the tag identifiers (step 808). The association can be recorded in RFID database 126 of server computer 108. This association can also include other information, such as the time and date of each image. This association can be useful when an asset 102 cannot be found in search mode or locate mode. Doorway mode can also be used to update the locations of assets 102, for example to indicate that an asset 102 has left the room.

The images associated with the asset 102 can be used to identify the last person that had possession of the asset 102, to identify an intruder and aid in their prosecution, and the like. Multiple images of the person can be useful to improve the ability to identify the person. For example, the gap between images in a series can be approximately 1 second. If the asset still cannot be found, security personnel can use the images to investigate.

Figure 9:
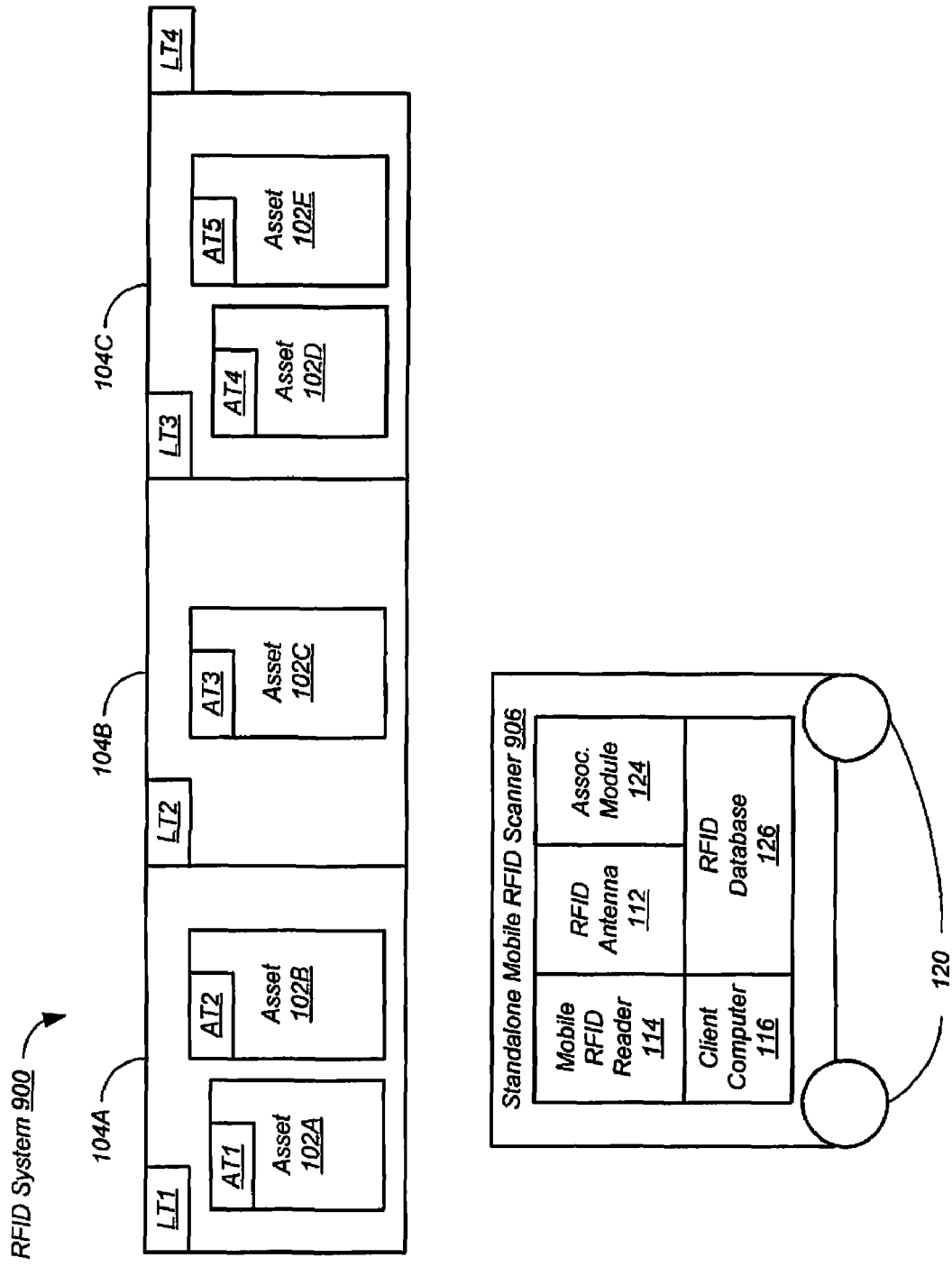
FIG. 9 shows elements of a RFID system including a standalone mobile RFID scanner according to some embodiments.

In some embodiments, the mobile RFID scanner is implemented as a standalone unit. In such implementations, the association module and RFID database are incorporated into the mobile RFID scanner. Therefore, no separate server is needed. FIG. 9 shows elements of a radio-frequency identification (RFID) system 900 including a standalone mobile RFID scanner 906 according to some embodiments. Although in the described embodiments, the elements of standalone RFID system 900 are presented in one arrangement, other embodiments may feature other arrangements, as will be apparent to one skilled in the relevant arts based on the disclosure and teachings provided herein. For example, the elements of standalone RFID system 900 can be implemented in hardware, software, or combinations thereof.

Referring to FIG. 9, RFID system 900 includes five assets 102A-E stored in three storage units 104A-C. Assets 102 and storage units 104 are tagged as described above. RFID system 900 further includes a standalone mobile RFID scanner 906. Mobile RFID scanner 106 includes one or more RFID antennas 112, mobile RFID reader 114, client computer 116, association module 124, and RFID database 126. The elements of standalone mobile RFID scanner 906 can be implemented as described above, and can operate in any of the modes described above.

While several modes of operation have been described above separately, it should be understood that these modes can be used alone or in combination. Furthermore, functions and apparatus of the different modes can be combined into a single apparatus implementing multiple modes.

Various embodiments can be implemented in digital electronic circuitry, or in computer hardware, firmware, software, or in combinations of them. Embodiments can be implemented in a computer program product tangibly embodied in a machine-readable storage device for execution by a programmable processor; and method steps can be performed by a programmable processor executing a program of instructions to perform functions by operating on input data and generating output. Embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. An apparatus comprising:
a first radio-frequency identification (RFID) reader configured to receive radio-frequency signals from a plurality of radio-frequency identification tags, wherein
the first radio-frequency identification reader is a mobile reader,
each of the radio-frequency signals represents a tag identifier associated with a respective one of the radio-frequency identification tags,
the radio-frequency identification tags include asset tags and location tags,
each of the asset tags is associated with a respective one of a plurality of first assets, and
each of the location tags is associated with a respective one of a plurality of first locations;
an association module configured to, based on the tag identifiers, generate first associations between (i) each of the plurality of first assets and (ii) one or more of the plurality of first locations,
a motion detector configured to detect motion, in a second location, of (i) a second asset, and (ii) one of the plurality of first assets;
a second radio-frequency identification reader configured to capture radio-frequency signals present in the second location in response to the detected motion, in the second location, of (i) the second asset, and (ii) the one of the plurality of first assets, wherein the second radio-frequency identification reader is a fixed reader, wherein the first radio-frequency identification reader and the second radio-frequency identification reader are in communication with the association module via a network, and
wherein the association module is configured to, in response to the radio-frequency signals captured in the second location, generate at least one second association between (i) the second location and (ii) the second asset, and the one of the plurality of first assets; and
a camera configured to create an image of the second location in response to the detected motion, in the second location, of the (i) the second asset, and (ii) the one of the plurality of first assets,
wherein the association module is configured to, in response to the radio-frequency signals captured in the second location, generate a third association relating the second location, the image, the second asset, and the one of the plurality of first assets; and
wherein the third association identifies a person who has moved one of (i) the one of the plurality of first assets from one of the first locations to the second location, and (ii) the second asset from the second location to one of the plurality of first locations.

2. The apparatus of claim 1, further comprising:
a radio-frequency identification scanner comprising
the first radio-frequency identification reader, and
a first network interface configured to transmit the tag identifiers; and
a server comprising
a second network interface configured to receive the tag identifiers, and
the association module.

3. The apparatus of claim 2, wherein the association module is configured to generate the first associations based on at least one of:
times the first radio-frequency identification reader receives the tag identifiers; or an order in which the first radio-frequency identification reader receives the tag identifiers.

4. The apparatus of claim 2, further comprising:
an input module configured to accept an indication of one or more of the plurality of first assets; and
a search module configured to identify one or more of the plurality of first locations based on (i) the indication, and (ii) the first associations.

5. The apparatus of claim 2, further comprising:
an input module configured to accept an indication of one or more of the plurality of first assets; and
a locate module configured to indicate when a radio-frequency signal representing a tag identifier associated with the one or more of the plurality of first assets is received by the first radio-frequency identification reader.

6. The apparatus of claim 5, wherein the locate module is configured to:
search for the one or more of the plurality of first assets; and
generate an alert signal when radio-frequency signals representing the tag identifiers associated with the one or more of the plurality of first assets are received by the first radio-frequency identification reader, wherein the alert signal indicates the one or more of the plurality of first assets is located.

7. A method comprising:
receiving radio-frequency signals from a plurality of radio-frequency identification tags by a first radio frequency-identification reader, wherein
the first radio-frequency identification reader is a mobile reader,
each of the radio-frequency signals represents a tag identifier associated with a respective one of the radio-frequency identification tags,
the radio-frequency identification tags include asset tags and location tags,
each of the asset tags is associated with a respective one of a plurality of first assets, and
each of the location tags is associated with a respective one of a plurality of first locations;
based on the tag identifiers, and via an association module, generating first associations between (i) each of the plurality of first assets and (ii) one or more of the plurality of first locations;
detecting motion, in a second location via a second radio frequency identification reader, of (i) a second asset, and (ii) one of the plurality of first assets, wherein the second radio frequency reader is a fixed reader, wherein the first radio-frequency identification reader and the second radio-frequency identification reader are in communication with the association module via a network;
capturing radio-frequency signals present in the second location in response to the detected motion, in the second location, of (i) the second asset, and (ii) the one of the plurality of first assets;
generating at least one second association between the second location and the (i) the second asset, and (ii) the one of the plurality of first assets;
creating an image of the second location via a camera and in response to the detected motion, in the second location, of (i) the second asset, and (ii) the one of the plurality of first assets;
in response to the radio-frequency signals captured in the second location, generating a third association relating the second location, the image, the second asset, and the one of the plurality of first asset; and
wherein the third association identifies a person who has moved one of (i) the one of the plurality of first assets from one of the first locations to the second location and (ii) the second asset from the second location to one of the plurality of first locations.

8. The method of claim 7, further comprising:
moving the first radio-frequency identification reader relative to the plurality of radio-frequency identification tags; and
generating the first associations based on at least one of times the first radio-frequency identification reader receives the tag identifiers, and
an order in which the first radio-frequency identification reader receives the tag identifiers.

9. The method of claim 7, further comprising:
accepting an indication of one or more of the plurality of first assets; and
identifying one or more of the plurality of first locations based on (i) the indication, and (ii) the first associations.

10. The method of claim 7, further comprising:
accepting an indication of one or more of the plurality of first assets; and
generating an indication when a radio-frequency signal representing a tag identifier associated with the one or more of the plurality of first assets is received by the first radio-frequency identification reader.

11. The method of claim 10, wherein generating the indication comprises:
searching for the one or more of the plurality of first assets; and
generating an alert signal when the one or more of the plurality of first assets is located.

12. An apparatus comprising:
a network interface configured to receive first-radio frequency signals including a plurality of first tag identifiers from a first radio-frequency identification reader, wherein
each of the plurality of first tag identifiers is associated with a respective radio-frequency identification tag,
the radio-frequency identification tags include asset tags and location tags;
the network interface is configured to receive second radio-frequency signals from a second radio-frequency identification reader,
the first radio-frequency identification reader is a mobile reader, and
the second radio-frequency identification reader is a fixed reader;
a radio-frequency identification database configured to store (i) a plurality of first entries and (ii) a plurality of second entries, wherein
each of the plurality of first entries associates one of the asset tags with a respective one of a plurality of first assets, and
each of the plurality of second entries associates one of the location tags with a respective one of a plurality of first locations;
an association module configured to, based on the first tag identifiers, the plurality of first entries, and the plurality of second entries, generate first associations between (i) each of the plurality of first assets and (ii) one or more of the plurality of first locations,
wherein the first radio-frequency identification reader and the second radio-frequency identification reader is in communication with the association module via a network;

a motion detector configured to detect motion, in a second location, of (i) an object, and (ii) one of the plurality of first assets; and a camera configured to create an image of the second location in response to the detected motion, in the second location, of (i) the object, and (ii) the one of the plurality of first assets, wherein the association module is configured to, in response to the second radio-frequency signals captured in the second location, generate an association relating the second location, the image, the object, and the one of the plurality of first assets; and wherein the association relating the second location, the image, the object, and the one of the plurality of first assets identifies a person who has moved one of (i) the one of the plurality of first assets from one of the first locations to the second location, and (ii) the object from the second location to one of the plurality of first locations.

13. The apparatus of claim 12, wherein:

the plurality of first tag identifiers are collected by the first radio-frequency identification reader as the first radio-frequency identification reader is moved relative to the radio-frequency identification tags; and the association module is configured to generate the first associations based on at least one of:
   times the first radio-frequency identification reader receives the plurality of first tag identifiers; and
   an order in which the first radio-frequency identification reader receives the first tag identifiers.

14. The apparatus of claim 12, further comprising a search module configured to identify one or more of the plurality of first locations based on (i) an indication, and (ii) the first associations, wherein the network interface is configured to receive the indication of one or more of the plurality of first assets.

15. The apparatus of claim 12, wherein:

the network interface is configured to receive an indication of one or more of the plurality of first assets; and the association module is configured to provide one or more of the plurality of first tag identifiers associated with the one or more of the plurality of first assets based on (i) the indication, and (ii) the first associations.

16. The apparatus of claim 12, wherein:

the network interface is configured to receive (i) a second tag identifier collected by the second radio-frequency identification reader and (ii) an image of the second location, wherein the second radio-frequency identification reader is located in the second location; and the association module is further configured to, based on the first associations and the second tag identifier, generate a second association relating the second location, the image, the object, and the one of the plurality of first assets.

17. The apparatus of claim 1, wherein the association module is configured to:

store the first associations as a cross-reference table in a memory; and in response to the detected motion, at least one of (i) create the second association of the second asset and the second location in the cross-reference table, and (ii) update one of the first associations for the one of the plurality of first assets to refer to the second location.

18. The apparatus of claim 1, wherein:

the first radio-frequency identification reader is configured to receive (i) a first radio-frequency signal from a radio-frequency identification tag of the second asset, and (ii) a second radio frequency signal from one of the location tags; and the association module is configured to
   store the first associations as a cross-reference table in a memory,
   store the third association of the second asset in the cross-reference table in the memory, and
   update the third association of the second asset in the cross-reference table to refer to one of the plurality of first locations in response to (i) the detected motion, (ii) the first radio-frequency signal, and (iii) the second radio frequency signal.

19. The apparatus of claim 1, wherein the association module is configured to:

store the first associations as a cross-reference table in a memory; and in response to the detected motion, update one of the first associations for the one of the plurality of first assets to refer to the second location.

20. The apparatus of claim 1, wherein:

the first locations refer to locations of at least one storage unit; and the second location does not refer to a location of a storage unit.

21. The apparatus of claim 12, wherein:

the object is an intruder; and the camera is configured to create the image of the object and the one of the plurality of first assets in the second location.

* * * * *